2,864,823
Patented Dec. 16, 1958

2,864,823
PROCESS FOR THE PRODUCTION OF ACYL-AMINO-AMINO-ANTHRAQUINONES

Heinz-Werner Schwechten, and Rütger Neeff, Leverkusen-Bayerwerk, Germany, assignors to Farbenfabriken Bayer Aktiengesellschaft, Leverkusen, Germany No Drawing. Application August 4, 1955
Serial No. 526,559

Claims priority, application Germany August 17, 1954

5 Claims. (Cl. 260—287)

This invention relates to a process for the production of acylamino-amino-anthraquinones.

It is known that acylamino anthraquinones, for example, acetyl and benzoyl amino-anthraquinones, may be deacylated to provide the basic amino-anthraquinones if they are heated to a moderately elevated temperature for a short time with concentrated sulphuric acid.

It has now been found that acylamino anthraquinones, the acyl radical of which is derived from a heterocyclic nitrogen-containing carboxylic acid, for example a pyridine, quinoline, phthalyl quinoline, thiazole, thiazole-anthrone or anthrapyrimidine carboxylic acid are surprisingly not saponified by concentrated sulphuric acid or other mineral acids even with heating to relatively high temperature (90–100° C.).

This observation is the basis of the process according to the invention, which facilitates the preparation of acylamino-amino-anthraquinones, which cannot be obtained technically by other methods.

Suitable starting materials for the present invention are mono- or poly-acylamino-amino-anthraquinones, the acyl group of which is derived from a simple acyl radical, such as, for example, an acetyl or benzoyl radical.

After these acylamino-amino-anthraquinones have been acylated with heterocyclic nitrogen containing carboxylic acid they can be partially saponified by heating with concentrated sulphuric acid, the simple acyl radical being split off.

For example, 1-amino-5-benzoyl-amino-anthraquinone, which may easily be obtained technically, can be acylated with a heterocyclic nitrogen-containing carboxylic acid. The diacyl compound is thereafter heated with concentrated sulphuric acid for a short time to approximately 90° C. or for a correspondingly longer time to temperatures between 40 and 90° C. The result is that only the benzoyl group is saponified and the corresponding 1-acyl-amino-5-amino-anthraquinone is obtained.

The acylamino-amino-anthraquinones obtainable according to the present process are valuable products for the manufacture of vat dyestuffs and can be used, for example, for the production of the vat dyestuffs of the copending application Ser. No. 526,560 which has been filed on even date.

The following examples further illustrate the invention without, in any way, limiting it.

Example 1

40 g. of the compound obtained by acylation of 1-amino-5-benzoyl-amino-anthraquinone with isonicotinic acid are dissolved in 460 g. of 96% sulphuric acid, the solution is heated for 15 minutes at 90° C. and then the concentration of the sulphuric acid is reduced to 50% by water at 20–30° C. being slowly added dropwise. The sulphate of 1-isonicotinoylamino-5-amino-anthraquinone, which is precipitated as yellow needles, is filtered off with suction and washed with substantially 50% sulphuric acid. After boiling the sulphate with water and adding ammonia, red needles are obtained which dissolve with a greenish-yellow colour in concentrated sulphuric acid. The yield is about 90% of the theoretical. The novel compound crystallises from aniline or quinoline as small brownish-red needles.

It is possible for the corresponding derivatives or nicotinic acid and picolinic acid to be obtained in a similar manner.

Example 2

40 g. of the compound obtained by acylation of 1-amino-4-benzoyl-amino-anthraquinone with isonicotinic acid are dissolved in 460 g. of concentrated sulphuric acid and the solution is heated for 15 minutes at 70° C. After cooling, the solution is added to ice, the precipitated reaction product is filtered, the residue is boiled with dilute ammonia and in this way 1-isonicotinoylamino-4-amino-anthraquinone is obtained as small blue needles, which dissolve with a red colour in concentrated sulphuric acid. The yield is practically quantitative. The novel compound crystallises very satisfactorily from nitrobenzene as violet needles.

Example 3

100 g. of the compound obtained by acylation of 1-amino-5-benzoylamino-anthraquinone with quinoline-8-carboxylic acid, are dissolved in 1000 g. of concentrated sulphuric acid and the solution is heated for 5 minutes at 90° C. The cooled solution is added to ice, the precipitated reaction product is filtered off, the residue is boiled with dilute ammonia and filtered with suction. The novel compound, which crystallises from 10 parts of pyridino as orange-red flakes, is then dried. The said compound is obtained with practically a quantitative yield. From the acylation product of 1-amino-5-benzoylamino-anthraquinone with quinoline-4-carboxylic acid or quinoline-6-carboxylic acid, it is possible in the same manner to obtain the corresponding derivatives of these acids which crystallise from nitrobenzene as brownish-red needles.

Example 4

40 g. of the compound obtained by acylation of 1-amino-5-benzoylamino-anthraquinone with 5,6-phthalyl quinoline-8-carboxylic acid, are dissolved at 60° C. in 400 g. of concentrated sulphuric acid, the solution is heated for 10 minutes at 90° C. and then cooled. The concentration of the sulphuric acid is reduced to 80% by water being added dropwise at 30–40° C. The sulphate of the novel compound then crystallises out as long yellow needles. After the concentration of the sulphuric acid has been lowered to 70% by adding more water, the sulphate is filtered with suction, washed with 70% sulphuric acid and decomposed by hot water, whereupon it changes through a blackish-red sulphate into a light-red crystalline powder. The yield of 1-(5', 6'-phthalyl quinoline-8'-carbonyl)-amino-5-amino-anthraquinone is about 95% of the theoretical. It crystallises from 20 parts of nitrobenzene as long brownish-red needles.

From the acylation product of 1-amino-5-benzoyl-amino-anthraquinone with thiazole-anthrone-2-carboxylic acid, it is possible in a similar manner to obtain practically a quantitative yield of the corresponding derivatives of this acid which crystallises from nitrobenzene as very sparingly soluble reddish-brown needles.

Example 5

15 g. of the compound obtained by acylation of 1-amino-5-benzoyl-amino-anthraquinone with 1,9-anthrapyrimidino-2-carboxylic acid are dissolved in 275 g. of 90% sulphuric acid and the solution heated for 3 minutes at 90° C. The cooled solution is then added to ice and filtered. The residue is boiled with dilute ammonia. The 1-(1',9'-anthrapyrimidino-2'-carbonyl)amino-5-amino-anthraquinone which is isolated with practically a quantitative yield may be transformed into small yellow crystals of the sulphate by dissolving in concentrated sulphuric acid and carefully diluting this solution with water to a sulphuric acid concentration of 75%. When these crystals are boiled with dilute ammonia, they are changed back to small red crystals of the reaction product. The compound is very sparingly soluble in nitrobenzene and crystallises therefrom as fine brownish-red needles.

We claim,

1. A process for the production of acylamino-amino-anthraquinones, which comprises treating with a mineral acid at a temperature between 40° C. to 100° C. a member selected from the group consisting of acetylamino-anthraquinone and benzoylamino-anthraquinone, said member containing a further acylamino group attached to the anthraquinone nucleus, the acyl radical of which is selected from the group consisting of pyridine carbonyl, quinoline carbonyl, phthalyl quinoline carbonyl, thiazole carbonyl, thiazole-anthrone carbonyl, and anthrapyrimidine carbonyl.

2. The process of claim 1 wherein the elevated temperature is between 40° C. and 100° C.

3. The process of claim 2 wherein the acid is concentrated sulfuric acid.

4. The process of claim 1 wherein the benzoylamino-anthraquinone is 1-(5',6'-phthalyl quinoline-8'-carbonyl)-amino-5-benzoylamino-anthraquinone.

5. The process of claim 1 wherein the benzoylamino-anthraquinone is 1-(thiazol anthrone-2'-carbonyl)-amino-5-benzoylamino-anthraquinone.

References Cited in the file of this patent

UNITED STATES PATENTS 2,040,860   Kunz et al. _____ May 19, 1936